US008414389B2

(12) United States Patent
Cahill et al.

(10) Patent No.: US 8,414,389 B2
(45) Date of Patent: Apr. 9, 2013

(54) MULTIVENDOR PROGRESSIVE GAMING SYSTEM

(75) Inventors: Tom Cahill, Newport, RI (US); Glenn Caldwell, Warwick, RI (US); Heather Clifford, Uncasville, CT (US); Deborah Hach, Palm Beach Gardens, FL (US); Ryan Reddy, Cranston, RI (US)

(73) Assignee: Spielo International Canada, ULC, Moncton, New Brunswick (CA)

( * ) Notice: Subject to any disclaimer, the term of this patent is extended or adjusted under 35 U.S.C. 154(b) by 0 days.

(21) Appl. No.: 13/340,151

(22) Filed: Dec. 29, 2011

(65) Prior Publication Data

US 2012/0149452 A1 Jun. 14, 2012

Related U.S. Application Data

(62) Division of application No. 10/935,933, filed on Sep. 7, 2004, now Pat. No. 8,109,827.

(51) Int. Cl.
*A63F 13/12* (2006.01)

(52) U.S. Cl. ................. 463/27; 463/26; 463/28; 463/42

(58) Field of Classification Search .................... 463/26, 463/27, 28, 42
See application file for complete search history.

(56) References Cited

U.S. PATENT DOCUMENTS 5,564,700 A * 10/1996 Celona ............................ 463/27
5,766,076 A * 6/1998 Pease et al. ...................... 463/27

* cited by examiner

*Primary Examiner* — Damon Pierce
(74) *Attorney, Agent, or Firm* — Sullivan & Worcester LLP; Christopher T. McWhinney

(57) ABSTRACT

Systems for facilitating the play of a progressive game. The systems are configured to accrue a portion of wagers to a multivendor progressive prize fund and track the amount accrued to the prize fund by a first set of game terminals in a first prize determination interval. Optionally, the system is configured to receive a second wager from a second player of a second game of chance, the second game of chance operating on a second game terminal in a second set of game terminals. Optionally the system determines that the second player has won a progressive prize. Optionally the system is configured to determine the value of the progressive prize, the value depending on the size of the multivendor progressive prize fund and on an amount of contributions accrued from the second set of game terminals to the multivendor progressive prize fund during a second prize determination interval.

27 Claims, 11 Drawing Sheets

MULTIVENDOR PROGRESSIVE GAMING SYSTEM

BACKGROUND INFORMATION

This application is a divisional of U.S. patent application Ser. No. 10/935,933 filed Sep. 7, 2004 the disclosure of which is expressly incorporated herein by reference.

Designers of games of chance often attempt to control both the size and frequency of payouts. Choosing the correct frequency and size of payouts can greatly increase the attractiveness of a game to a gaming customer. One way large payouts are made economically feasible is by the use of a progressive game. In a conventional progressive game, a portion of each wager in a base of some of chance is contributed to a progressive prize pool. Periodically, a player of the base game may win all or a portion of the accumulated progressive prize pool.

An individual game machine may have an associated progressive jackpot for that machine alone. Any conventional game machine may be associated with a progressive game, e.g. slot machines, poker machines, keno machines, video lottery terminals, pull-tab machines, lottery ticket vending machines or other types of game machines. Alternatively, to increase the size of the potential jackpot, multiple game machines may all contribute to the same progressive jackpot. These multiple game machines, generally identical in type and manufacture, may be connected with a progressive host which controls the progressive game, tracks the contributions, and awards the progressive prize. The more machines that are included, the larger the potential jackpot that can be supported in an economically feasible manner, and the more attractive the game is to players who are attracted by large "life changing event" jackpots. To further increase the progressive jackpot prize, a wide area progressive system may be implemented, where machines in different geographical locations are connected together, for example, in a WAN.

Prior art progressive games do not allow multiple types of game terminals supplied by different manufacturers, running different base games, and operated by multiple independent operators to participate in a single progressive game. Prior art progressive games also do not allow the game terminal or local game server to determine a winner for a progressive prize which includes multiple terminals and/or multiple locations.

DETAILED DESCRIPTION OF EXAMPLE EMBODIMENTS

Figure 1:
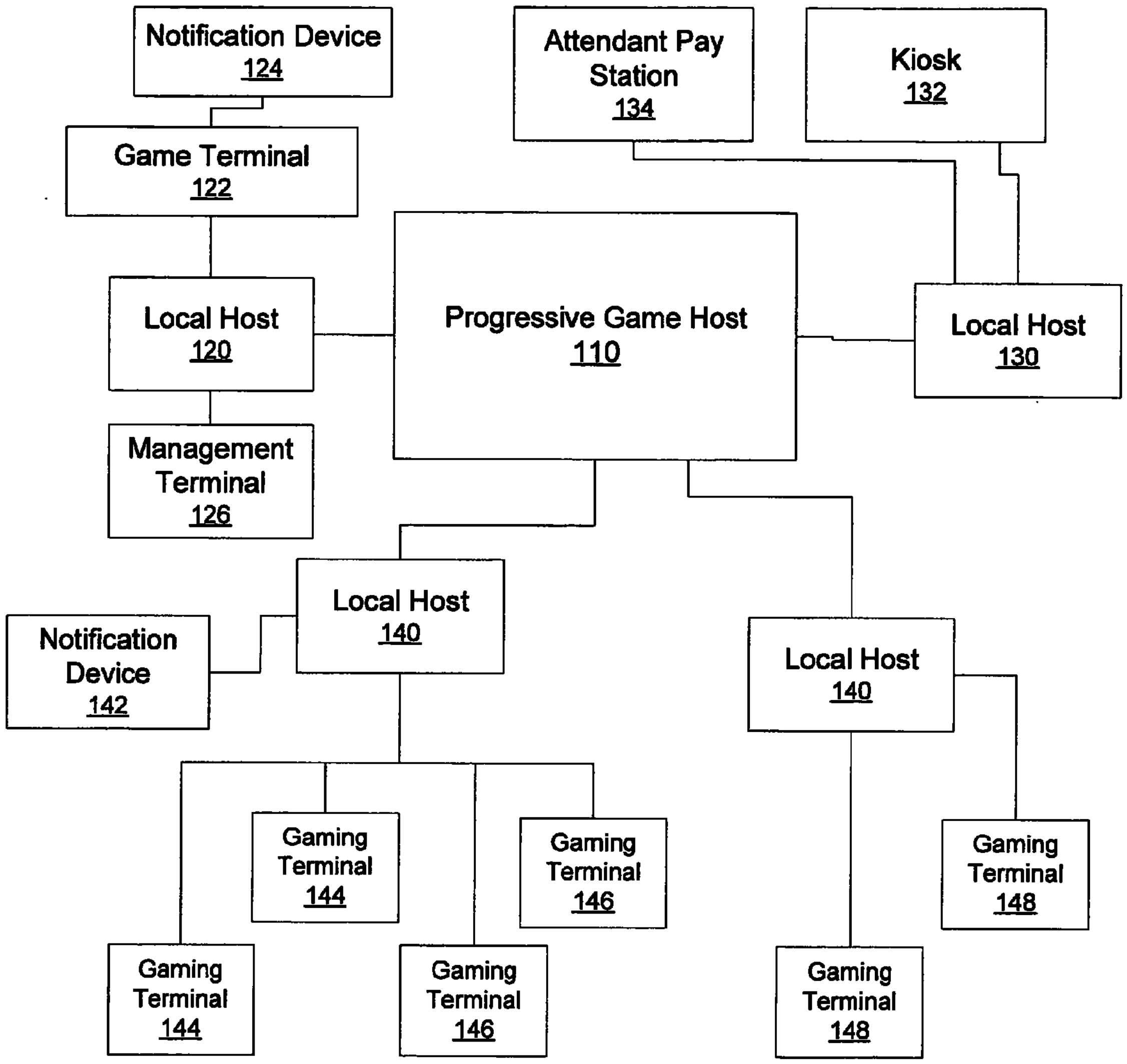
FIG. 1 illustrates an example progressive game system.

Example embodiments of the present invention are described below. These embodiments are meant to be exemplary and not limiting. The limits of the claimed invention are defined by the attached claims. Skilled artisans will recognize that many variations of the proposed embodiments are possible within the scope of the attached claims.

An example embodiment of the present invention may include a procedure for facilitating the play of a multi-vendor progressive game. The example procedure may include receiving a first wager from a first player of a first game of chance, the first game of chance operating on a first game terminal in a first set of game terminals. The example procedure may further include accruing a portion of the first wager to a multi-vendor progressive prize fund; tracking the total amount accrued to the multi-vendor progressive prize fund by the first set of game terminals in a first prize determination interval. The example procedure may further include receiving a second wager from a second player of a second game of chance, the second game of chance operating on a second game terminal in a second set of game terminals. The example procedure may further include determining that the second player has won a progressive prize. The example procedure may further include determining the value of the progressive prize, the value of the progressive prize depending on the size of the multi-vendor progressive prize fund and on an amount of contributions accrued from the second set of game terminals to the multi-vendor progressive prize fund during a second prize determination interval.

In some of the example procedures, the first set of game terminals may be a set of game terminals all providing the first game of chance.

In some of the example procedures, the first set of game terminals is a set of game terminals all operated by a common game terminal operator.

In some of the example procedures, the first set of game terminals is a set of game terminals all located at a single geographic location.

In some of the example procedures, the first set of game terminals is a set of game terminals located at multiple geographic locations.

Some of the example procedures further include determining the first player has not won the progressive prize.

In some of the example procedures, the first game of chance is one of a first set of games of chance which operate on the first set of game terminals.

In some of the example procedures, the odds of winning the progressive prize in a game play are independent of which game in the first set of games is played.

In some of the example procedures, the first set of terminals and the second set of terminals are located at different respective geographic locations.

In some of the example procedures, the first set of game terminals are split among multiple geographic locations.

In some of the example procedures, the first set of game terminals and the second set of game terminals are provided by different game terminal vendors.

In some of the example procedures, the first set of game terminals and the second set of game terminals of chance are operated by different game operators.

In some of the example procedures, the progressive prize determination interval is the same for each set of game terminals.

In some of the example procedures, the progressive prize determination interval is the time since any player has last won the progressive prize.

In some of the example procedures, the progressive prize determination interval is a predetermined interval of time.

In some of the example procedures, the progressive prize interval is determined separately for different sets of game terminals.

In some of the example procedures, the first progressive prize determination interval is the time since any player using the first set of game terminals last won the progressive prize and the second progressive prize determination interval is the time since any player using the second set of terminals last won the progressive prize.

In some of the example procedures, the first progressive prize determination interval is a first predetermined interval of time associated with the first set of game terminals and the second progressive prize determination interval is a second predetermined interval of time associated with the second set of game terminals.

In some of the example procedures, each game terminal in each set of game terminals contributes the same monetary amount to the progressive prize pool for each game play.

In some of the example procedures, each game terminal in each set of game terminals contributes the same percentage amount of a player's wager to the multi-vendor progressive prize pool for each game play.

In some of the example procedures, each game terminal in a set of game terminals contributes the same monetary amount to the multi-vendor progressive prize pool for each game play, but game terminals from different sets of game terminals contribute different amounts.

In some of the example procedures, each terminal in the first set of game terminals contributes an amount to the progressive prize pool determined by the operator of the first set of game terminals.

In some of the example procedures, the contribution amount determined by the operator of the first set of game terminals is in a predetermined contribution range set by the operator of the progressive game.

In some of the example procedures, each game terminal in a set of game terminals contributes the same percentage amount of a player's wager to the multi-vendor progressive prize pool for each game play, but game terminals from different sets of game terminals contribute different amounts In some of the example procedures, each terminal in the first set of game terminals contributes a percentage amount to the progressive prize pool determined by the operator of the first set of game terminals.

In some of the example procedures, the contribution percentage determined by the operator of the first set of game terminals is in a predetermined contribution percentage range set by the operator of the progressive game.

Some of the example procedures may further include paying aggregate accrued contributions to the multi-vendor progressive prize pool from a set of game terminals at a predetermined payment interval.

Some of the example procedures may further include reporting aggregate accrued contribution to the multi-vendor progressive prize pool from a set of game terminals at a predetermined reporting interval.

Some of the example procedures may further include reporting accrued contributions from a set of game terminals to the multi-vendor progressive prize pool in real-time.

In some of the example procedures, the winning of the progressive prize is determined by a progressive game server.

In some of the example procedures, the winning of the progressive prize by the second player is determined by the second game machine.

In some of the example procedures, the winning of the progressive prize by the second player is determined by a management server for the second set of games.

In some of the example procedures, the management server for the second set of games is operated by the operator of the second set of games.

In some of the example procedures, the management server for the second set of games is located in the same geographical location as the second set of game terminals.

In some of the example procedures, the odds of winning the progressive prize during a particular game play are the same for every game played at each game terminal in each set of game terminals.

In some of the example procedures, the odds of winning the progressive prize during a particular game play are set by a progressive game server.

In some of the example procedures, the odds of winning the progressive prize during a game play are different for the first game terminal and the second game terminal, but are the same for each game terminal in the first set of game terminals and for each game terminal in the second set of game terminals.

In some of the example procedures, the odds of winning the progressive prize during a game play at one of the first set of game terminals is set by the operator of the first set of game terminals.

In some of the example procedures, the odds of winning the progressive prize during a game play at one of the first set of game terminals that is set by the operator of the first set of game terminals lies in a predetermined odds range set by the operator of the progressive game.

In some of the example procedures, the odds of winning the progressive prize during a game play at one of the first set of game terminals varies with the total contributions made by the first set of game terminals to the progressive prize fund during the first prize determination interval.

In some of the example procedures, the progressive prize is a share of the multi-vendor progressive prize fund approximately proportional to the contributions accrued by the second set of games of chance to the multi-vendor progressive prize fund during the second prize determination interval.

In some of the example procedures, the progressive prize is a share of the multi-vendor progressive prize fund equal to the contributions accrued by the second set of games of chance to the multi-vendor progressive prize fund during the second prize determination interval divided by the total contributions accrued by all sets of game terminals to the multi-vendor progressive prize fund during the second prize determination interval.

In some of the example procedures, the progressive prize is a share of the multi-vendor progressive prize fund approximately inversely proportional to the total contributions accrued by all sets of game terminals to the multi-vendor progressive prize fund during the second prize determination interval.

Some of the example procedures may further include subtracting the progressive prize from the multi-vendor progressive prize fund.

Some of the example procedures may further include resetting the multi-vendor progressive prize fund so that the fund is at least as great as a predetermined minimum multi-vendor progressive prize fund floor.

In some of the example procedures, the progressive prize is paid to the second player by the operator of the second set of games.

In some of the example procedures, the progressive prize is paid to the second player by the progressive game operator.

Some of the example procedures may further include sending a notification that the progressive prize has been won.

In some of the example procedures, the notification is sent to the second game terminal.

In some of the example procedures, the notification is sent to a notification device located at the same geographic location as the second game terminal.

In some of the example procedures, the notification is sent to a management terminal at the same geographic location as the second game terminal.

In another example embodiment of the present invention, a system for facilitating the play of a game of chance may be provided. The example system may include several base games. The example system may further include several game terminals located in several different locations, each of the game terminals configured to allow a player to play at least one of the base games, the game terminals being divided into sets of game terminals, each of the sets of game terminals having a respective contribution interval. The example system may further include a progressive game server. The example system may further include a network providing communication from the game terminals toward the progressive game server. The example system may further include a shared progressive game jackpot maintained by the progressive game server, the progressive game jackpot accruing contributions as a result of a players playing games on the plurality of game terminals. The example system may further include the progressive game server determining the size of the progressive prize when a winning player wins the progressive game on a game terminal in the first set of game terminals, the size of the progressive prize depending on the amount of contributions accrued from the first set of game terminals to the shared progressive game jackpot in the first set of game terminals' progressive contribution interval.

Some example systems may further include a management server, in communication with the first set of game terminals.

In some example systems, the management server is configured to receive information about the play of base games on the first set of game terminals and to transmit a subset of this information toward the progressive game server.

In some example systems, the management server determines that the progressive game has been won when the winning player wins the progressive game.

In some example systems, the progressive server determines that the progressive game has been won and provides notification to the management server.

In some example systems, the management server aggregates data from the first set of game terminals and forwards the aggregated data to the progressive game server at regular intervals.

In some example systems, the progressive game server determines the progressive game has been won.

In some example systems, the game terminal determines that the progressive game has been won.

Some example systems may further include a contribution fraction associated with a respective one of the sets of game terminals, the contribution percentage indicating a fraction of a player's wager at any game terminal in the set of game terminals which is accrued to the shared progressive game jackpot when a game is played at the game terminal.

Some example systems may further include a contribution fraction range stored on the progressive game server, the contribution fraction range containing all respective contribution fractions for the plurality of sets of game terminals.

Some example systems may further include a contribution amount associated with a respective one of the a sets of game terminals, the contribution amount indicating an amount from a player's wager at any game terminal in the set of game terminals which is accrued to the shared progressive game jackpot when a game is played at the game terminal.

Some example systems may further include a contribution amount range stored on the progressive game server, the contribution amount range containing all contribution amounts for the plurality of sets of game terminals.

In some example systems, the contribution intervals for each set of game terminals is the same.

In some example systems, the contribution interval is the time since any player last won the shared progressive game jackpot.

In some example systems, the contribution interval is a predetermined time interval.

In some example systems, the contribution interval for a set of game terminals is the time since any player won the progressive jackpot on any game terminal in the set of game terminals.

In some example systems, the contribution interval for a set of game terminals is a predetermined time interval associated with the set of game terminals.

In some example systems, the progressive server decrements the progressive prize jackpot by the size of the progressive prize, when the progressive prize is awarded.

In some example systems, the progressive server set the progressive prize jackpot to be at least equal to a minimum progressive prize floor after the progressive prize has been awarded.

In some example systems, the size of the progressive prize is approximately proportion to the contributions accrued from the first set of game terminals during the first progressive prize contribution interval.

In some example systems, the size of the progressive prize is proportional to the contributions accrued from the first set of game terminals during the first progressive prize contribution interval divided by the total progressive prize contributions from all sets of game terminals in the first progressive prize contribution interval.

Some example systems further include a minimum contribution threshold stored on the progressive game server, the minimum contribution threshold indicating a minimum amount of contributions to the shared progressive prize jackpot that must be accrued from a set of game terminals before the progressive prize can be won by a player playing at a game terminal in the set of game terminals.

Some example systems further include a minimum inter-prize threshold stored on the progressive game server, the minimum inter-prize threshold indicating a minimum amount of time that must elapse after a player wins the progressive prize at a game terminal in a set of game terminals until another player is eligible to win the progressive prize at any game terminal in the set of game terminals.

Some example systems further include a progressive win notification device associated with one of the sets of game terminals, the progressive win notification device in communication with the progressive server, receiving an indication that the progressive prize has been won by a game terminal in the set of game terminals, and providing a notification that the prize has been won after the indication has been received.

In some example systems, the progressive win notification device is not connected with a game terminal.

FIG. 1 illustrates an example progressive game system, according to an example embodiment of the present invention. A progressive game host 110 may control and operate the progressive game across a range of geographical areas, for a range of base game types, a range of different game terminal brands, and a range of game terminal operators. The progressive game host may be a dedicated computer, or may be a large computer which operates a range of games besides the progressive game, e.g., a lottery operations central server for a particular jurisdiction or set of jurisdictions.

A local host 120 may be remotely located from the progressive game host. The local host 120 may be in communication with the progressive game host 110, e.g., via a secure internet connection, a dedicated private line, or dial-up connection. In communication with, and generally but not always co-located with the local host 120 may be a game terminal 122. The game terminal may be any conventional game terminal, e.g., a video lottery terminal, video poker machine, slot machine, etc., that provides a base game that is separate from the progressive game. The local host 120 may manage the network, provide communications and control, protocol conversion, etc. for one or more game terminals 122. The local host may also provide a local management interface for a group of game terminals, e.g., accounting, monitoring, etc. Attached to the game terminal 122, but in communication with the local host and progressive game host is a notification device 124. The notification device 124 provides notification to players that a progressive win has occurred when a player is playing a game on the game terminal 122. It may also take other action, e.g., locking the game terminal when a progressive win occurs. Also in communication with local host 120, may be a management terminal 126. This may be provided to allow the game terminal operator to control the game terminals, account for an audit operations, and generally maintain the game system. The management terminal 126 may also provide an interface for the game terminal operator to control the communications interaction between the local base games running on the game terminals and the shared progressive game, e.g., by setting contribution amounts, minimum prizes, etc. This information may be communicated between the management terminal and the progressive game host via the local host. In some systems, the management terminal may also serve as a type of notification device, e.g., in situations where game operators make a personal appearance to award an extremely large prize.

In some example embodiments of the present invention, multiple types of game terminals, multiple local networking systems, multiple game vendors, and multiple game operators may all participate in a progressive game operated by the common progressive game host 110.

Local host 130, rather than interfacing with game terminals, provides an interface, networking, and control for a kiosk 132. This kiosk 132 may be used as a vending machine, e.g., to vend instant win lottery tickets. The purchase of an instant win or other lottery ticket may then be treated as an event which triggers an entry in the common progressive prize pool. Also connected to local host 130 is a cashier operated pay station 134, where lottery tickets and/or other items can be purchased, and where winning lottery tickets can be redeemed. The sale or redemption of a lottery ticket at the attended pay station may also be used as an event which allows an entry into the shared progressive prize pool, assuming such an entry is allowed by the regulations governing the operation of the lottery and the progressive game.

Local host 140 and local host 150 provide interfaces between the progressive game host 110 and other types of gaming terminals, in this case 144, 146 and 148. The local hosts 140 and 150 need not be at the same location, or operated by the same operator as the progressive game or each other. Similarly the different types of gaming terminals 144, 146, and 148 may be from different providers, and provide entirely different types of base games.

Notification device 142 is in communication with local host 140 and not connected to the game terminals. This is an alternative local host architecture from that illustrated with local host 120. In this case, notification of a progressive win is not sent directly to the game terminal, but is instead may first be sent to a centralized notification device 142. Follow-up action, such as presenting a prize to the winner, providing visual or auditory signals for the entire gaming venue, etc. may then be controlled by the centralized notification device.

Figure 2:
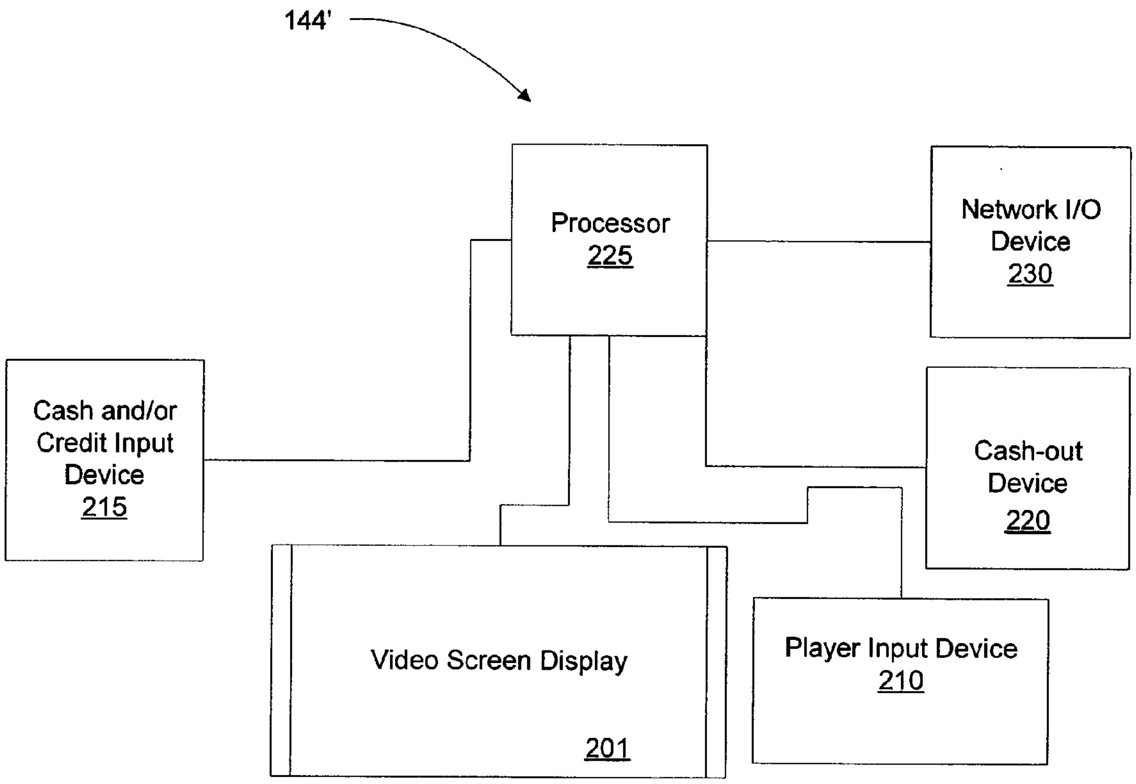
FIG. 2 illustrates an example game terminal, according to an example embodiment of the present invention.

FIG. 2 illustrates an example game terminal, according to an example embodiment of the present invention. This illustrated game terminal may be gaming terminal 144', corresponding to previously discussed game terminal 144 illustrated in FIG. 1, or some other game terminal associated with the system. The game terminal 144' may include a video screen display 201. This display may be used to display rules for the base game, provide output related to the base game, display advertising, and also to display outputs to the customer that are related to the progressive game. The gaming terminal 144' may also include a player input device 210 that allows the player to enter instructions to play the base game. The player input device may be separate, or may be incorporated in the video screen display, e.g., a touch screen.

The example game terminal 144' may also include a cash and/or credit input device 215, e.g., a bill acceptor, a coin input device, a credit card reader, a paper credit slip reader, a smart card interface, or other device that allows the player to obtain game credit for the play of the base game.

The gaming terminal 144' may also include a processor 225 in communication with the other illustrated components of the game terminal, e.g., through a bus or a local network connection. The processor controls the operation of the game terminal, the base game, and the interface with the progressive game.

A network I/O device 230 may be provided in the game terminal 144' to allow the game terminal processor 225 to communicate with other elements of the progressive game system, as well as any other elements used to provide the base game, e.g., with a local host or central game host. Any conventional networking approach may be employed, e.g., TCP/IP, Ethernet, PCMCIA, token ring, etc.

The game terminal 144' may also include a cash-out device 220. This device allows a player to discontinue playing at the game terminal 144'. In some systems, this device may pay out cash. In other systems, a card, credit slip, or other token may be provided allowing the player to take credit earned on game terminal 144' to play at another game terminal, e.g., game terminal 146, or to redeem game credit for cash, e.g., at a cashier location.

Figure 3:
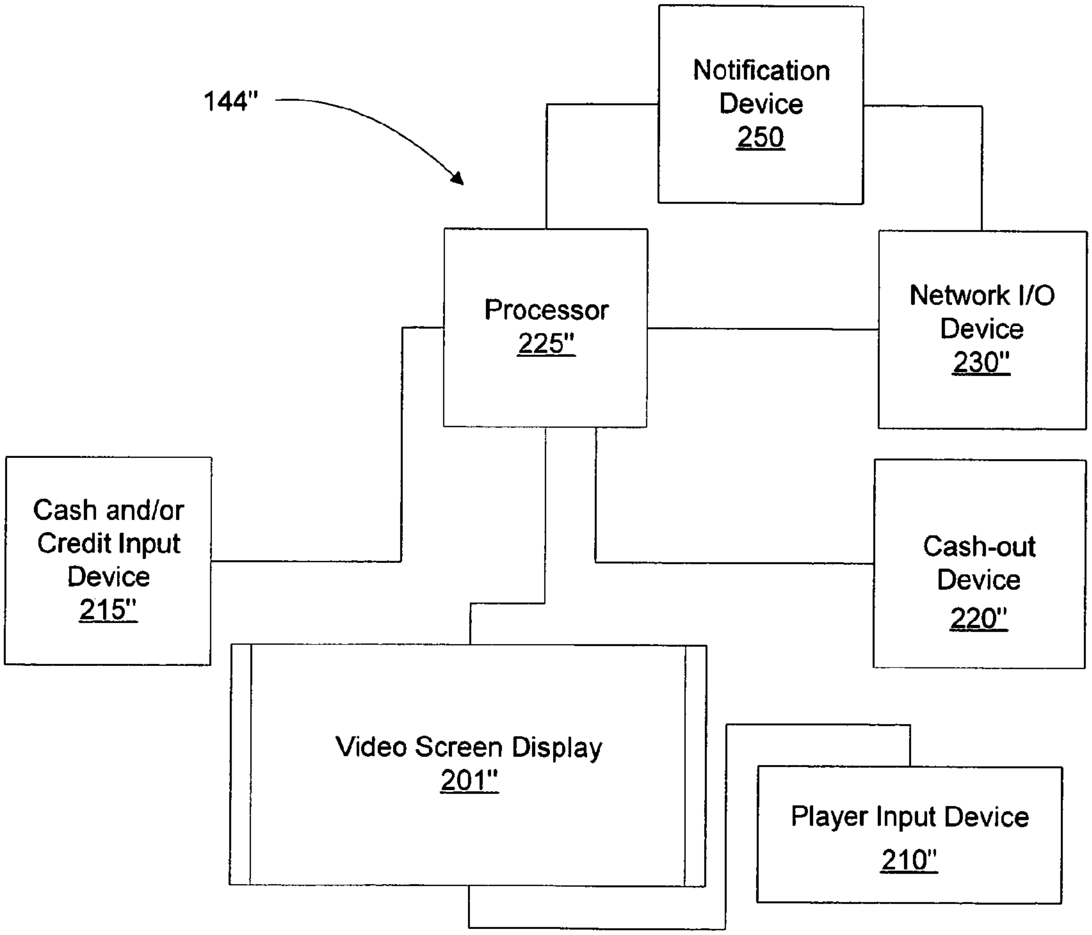
FIG. 3 illustrates an alternative example game terminal with a notification device, according to an example embodiment of the present invention.

FIG. 3 illustrates an alternative example game terminal, according to an example embodiment of the present invention. The components with corresponding numbers may be similar in type and structure to those illustrated in FIG. 2, with the key differences described below. In FIG. 3, the game terminal 144" is directly coupled with a notification device 250. The notification device 250 may have its own direct connection to the network, may share a network I/O device 230" with the game terminal as shown, or may communicate indirectly via the processor 225". The notification device receives information from the progressive game host when a player at the game terminal wins the progressive game. This information may include the amount of the progressive prize. For sufficiently large prizes, the notification device may then lock, or instruct the processor to lock the game terminal, so that the prize can be validated and awarded. The notification device may also include visual and auditory elements to notify players that a progressive prize has been won, e.g., horns, bells, flashing lights, sirens, etc. Alternatively, these notifications may be provided by the game terminal itself, e.g., via the video screen display 201".

In addition to the presence of the game terminal notification device, another difference between the example game terminals in FIGS. 2 and 3 is the nature of the player input device. In FIG. 3, the example game terminal player input device 210" communicates with the processor through the video screen display device. This may occur, e.g., in a touch screen, where the input device may be an integrated part of the display.

Figure 4:
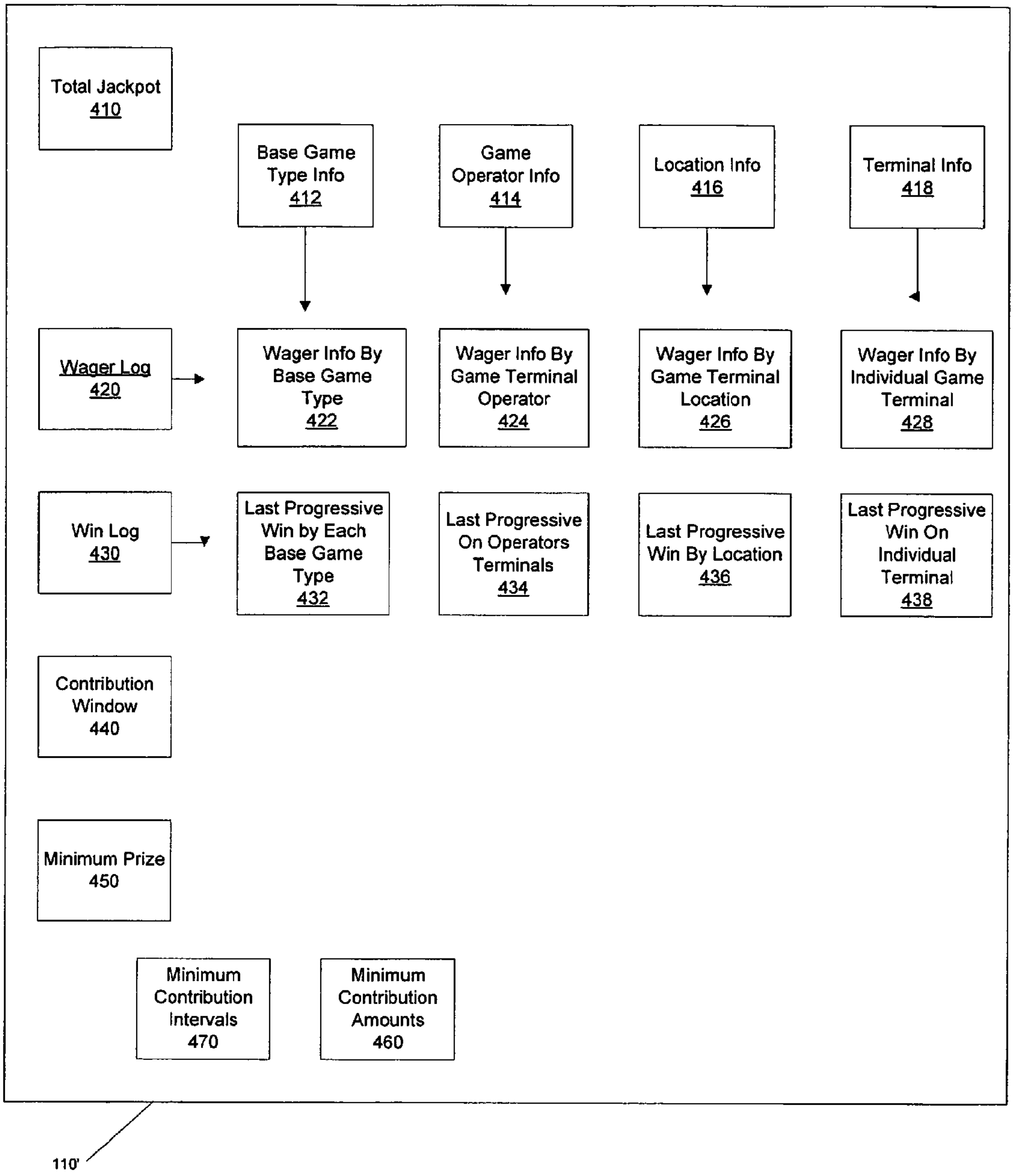
FIG. 4 illustrates example progressive game control information, according to an example embodiment of the present invention.

FIG. 4 illustrates example progressive game control information, according to an example embodiment of the present invention. The game control information may be maintained by a progressive game server, e.g., in various forms of memory or storage devices, in a relational database, with object-oriented data structures, or other conventional approaches. It will be appreciated that other information besides that shown may be maintained by the progressive game server, and that in alternative embodiments, the information may be maintained in different formats, or in other locations, e.g., partly on local servers or game terminals.

The example progressive game control information may include a total jackpot 410. This jackpot may include all contributions made by participating game terminals to the progressive game that have not been awarded as prizes. This amount should grow as games are played, and will shrink when prizes are awarded. It may be advantageous to display this total amount in a way that makes players of the progressive games aware of the amount, e.g., to display large potential prizes on the game terminals to stimulate additional game play.

The example progressive game control information may include base game type information 412. This information provides ways to access or determine different types of game control information for a particular base game or games. This may include indexes that allow log information to be aggregated, running totals, database queries, or other information that allows the information to be accessed by base game type.

The example progressive game control information may include game operator information 414. This information provides ways to access or determine different types of game control information for a particular operator of game terminals. This may include indexes that allow log information to be aggregated, running totals, database queries, or other information that allows the information to be accessed by game terminal operator type.

The example progressive game control information may include location information 416. This information provides ways to access or determine different types of game control information for particularly geographic locations. This may include indexes that allow log information to be aggregated, running totals, database queries, or other information that allows the information to be accessed by geographic location.

The example progressive game control information may include terminal information 418. This information provides ways to access or determine different types of game control information for a particular terminal or terminals. This may include indexes that allow log information to be aggregated, running totals, database queries, or other information that allows the information to be accessed by game terminal.

The example progressive game control information may include wager log information 420. This may include a raw log of wagers made by terminal, base game type, operator, time, amount, etc. This information may be maintained in a raw form, or may be aggregated in real time to allow decisions to be made based on the total amount wagered in some subset of terminals. The wager log data may include or be associated with more detailed information, e.g. information on total wagering in an interval by base game type 422, information on total wagering in an interval by game terminal operator 424, information on total wagering in an interval by game terminal location 426, and information on total wagering in an interval by individual game terminals 428. It will be appreciated that other types of wagering records may also be maintained.

The example progressive game control information may include win log information 440. This may include a raw log of progressive made by terminal, base game type, operator, time, amount, etc. This information may be maintained in a raw form, or may be aggregated in real time to allow decisions to be made based on the total amount wagered in some subset of terminals. The win log data may include or be associated with more detailed information, e.g. information on progressive game wins by base game type 432, information on progressive game wins by game terminal operator 434, information on progressive game wins by game terminal location 436, and on progressive game wins by individual game terminals 438. It will be appreciated that other types of win information may also be maintained.

The example progressive game control information may include contribution window information 440. This information may include the length of a contribution window during which wager information is tracked. The tracked information in the contribution window may be used for determining the amount of progressive wins. This window may also include a contribution window by base game type, operator, location, or other attribute.

The example progressive game control information may also include minimum prize information 450. This information may include information on minimum prizes to be awarded for progressive wins by base game type, by operator, by location etc.

Minimum prize contribution amount information 460 may also be stored. This information may indicate the minimum amount of contributions that must be received before a progressive prize may be awarded. This minimum may be for the progressive game as a whole, or for a particular geographic location, base game, operator, or other subset of the game terminals.

Minimum prize interval information 470 may also be stored. This information may indicate the minimum amount of time that must pass between the awarding of successive progressive prizes. This minimum may be for the progressive game as a whole, or for a particular geographic location, base game, operator, or other subset of the game terminals.

Alternatively or additionally, information may be stored which indicates minimum base contributions that jackpots are refilled with after a progressive win.

It will be appreciated that other types of information may also be saved in order to help operate the progressive game.

This information may be stored in any conventional manner, and need not be stored on the central progressive host, e.g., more distributed architectures may be employed.

Figure 5:
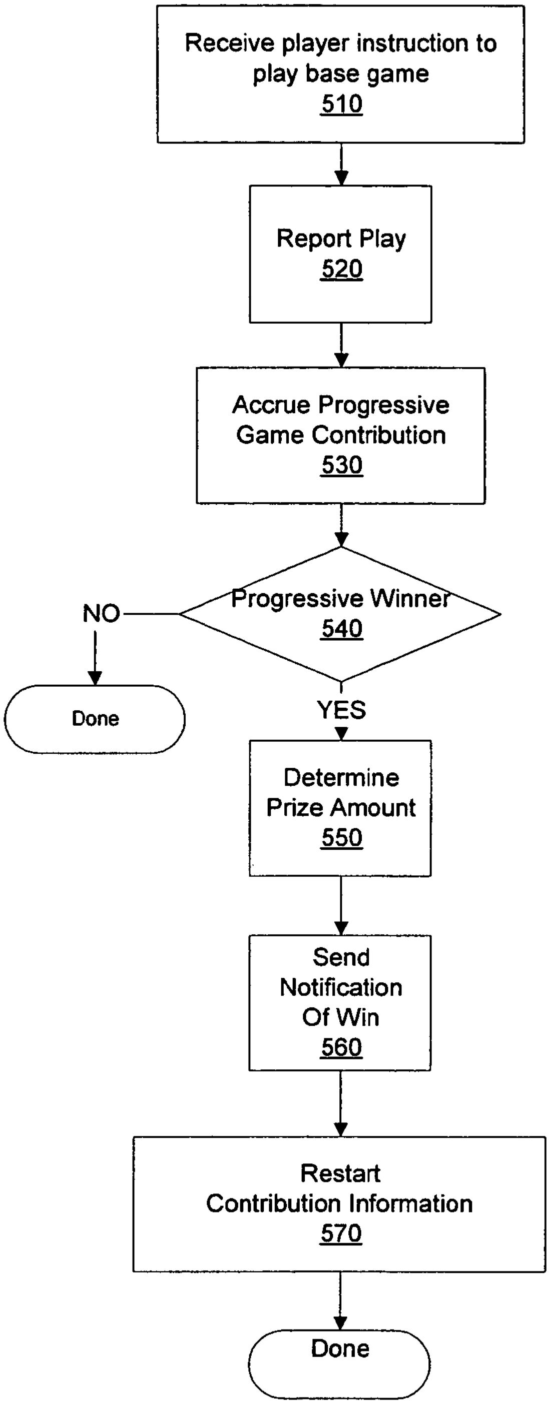
FIG. 5 illustrates an example procedure for controlling a progressive game which includes multiple associated games, according to an example embodiment of the present invention.

FIG. 5 illustrates an example progressive game control procedure, according to an example embodiment of the present invention.

In 510, an instruction may be received from a player to play a game, e.g., a base game on a game terminal. This could include pulling the lever on a slot machine, making a play on a video blackjack or poker machine, entering a video lottery, etc. Alternatively, some other even could trigger the example procedure, e.g., the purchase of a lottery ticket or some other transaction.

As an alternative, entry in the progressive game might be optional for the player. In this case, some sort of input would be required from the player to indicate that they wished to play the progressive game in conjunction with the base game. This selection might be made explicitly for each base game played, or by default for a given playing session.

In 520, information about the purchase or game play event may be communicated from the point of play or purchases, e.g., from a game terminal, through a local host, to a central progressive game server. Depending on the architecture employed, this information may be conveyed in real time on a single even message base, or may be aggregated over time and across multiple game terminals. The reported event may include information about a contribution to a progressive game, e.g., if the amount of contribution is not fixed, or if the player only participates in the progressive game on an optional basis.

In 530, information about contributions to the progressive game may be accrued. For example contributions may be added to the total progressive prize pool. Information on contributions may also be updated, e.g., information on total contribution by base game operator, base game type, etc.

In 540, whether the particular entry in the progressive game is a winner may be determined. This is typically done by the progressive central server, but may also be done in alternative example embodiments by the game terminal itself, or by the local host. If there is no progressive win, no further action is taken. If there are minimum contribution or time thresholds in place, e.g., requiring a minimum amount of contributions or a minimum time since a last progressive prize was awarded, either for the system as a whole, or for a subset of the game terminals which includes terminal that is the source of the event in the particular iteration of this example procedure, win checking may be skipped, and the event treated automatically as a one that will not result in a progressive game win.

In 550, the amount of the progressive prize to be awarded may be determined. In conventional progressive games this is typically the entire progressive prize pool. However, in example embodiments illustrated here, the size of the prize may be determined based on relative contributions to the fund, discussed in more detail below. This approach allows, within certain limits, local servers or game terminals to determine themselves whether a progressive prize has been won, without requiring this determination to be made by the progressive game operator.

In 560, win notification may be sent, e.g., from the progressive game central server to a notification device co-located with the game terminal where the winning customer is playing. Alternatively, notification may be sent directly to the game terminal, to a management terminal connected to a local game server, or to some other location, depending on the procedure used to award the progressive prize to the player. Particularly, for large prizes, it will be appreciated that additional steps and security may be prevented to prevent fraudulent abuse of the progressive game system, e.g., by game operators.

In 570, information on progressive game contributions and last progressive win may be reset. This information may be global, for all participating game terminals, in which case all information is reset. Alternatively, information on last win and contribution may be divided by game operator, base game type, location, etc. In this case, the appropriate information is updated to reflect the progressive win.

It will be appreciated that other activities may be included in the progressive game control procedure, e.g., additional security measures, report generation, accounting, etc.

Figure 6:
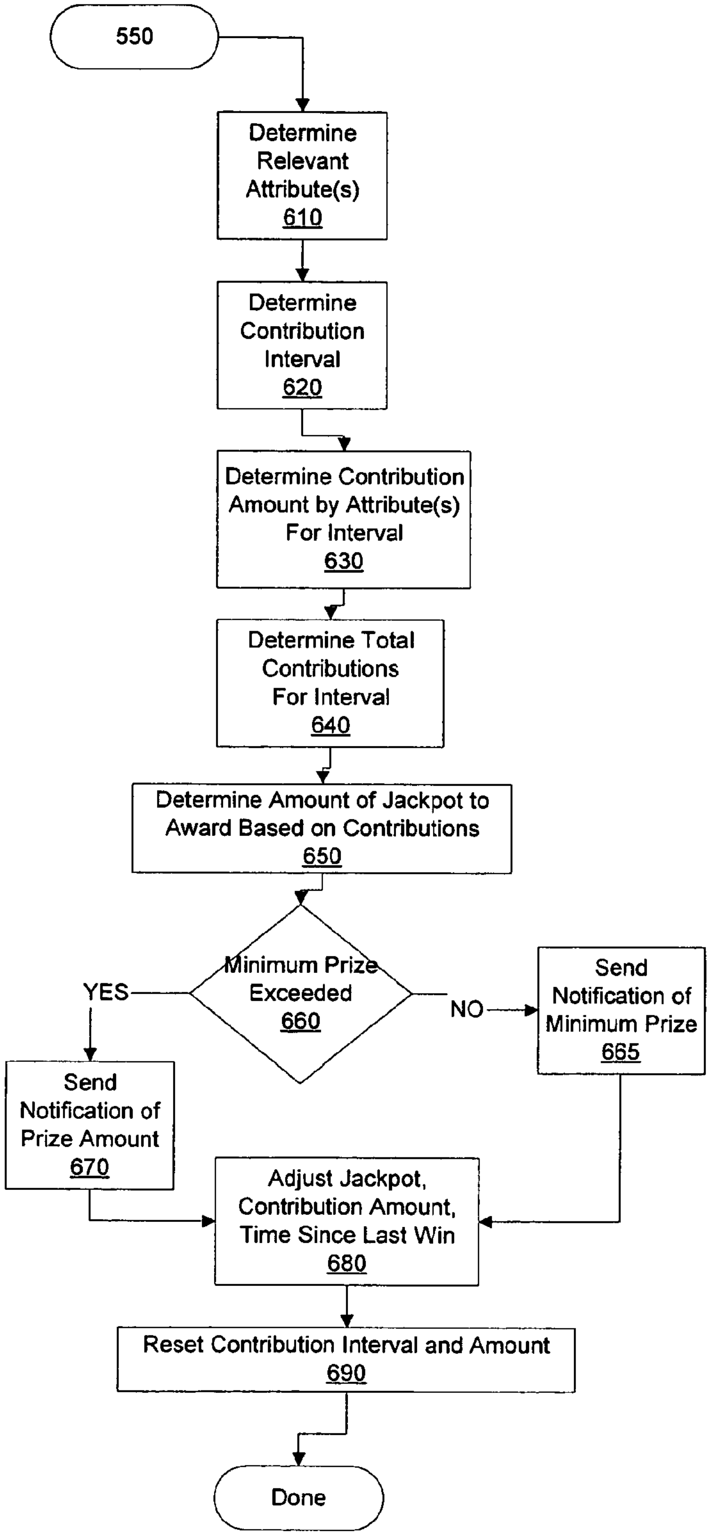
FIG. 6, illustrates an example procedure for determining a progressive prize, according to an example embodiment of the present invention.

FIG. 6 illustrates an example progressive game payout determination procedure, according to an example embodiment of the present invention.

In 610, the relevant attributes that are necessary for determining the amount of the progressive prize may be determined. These may be pre-set choices which may include, the operator, the location, the type of base game, etc. For illustrative purposes, we only discuss the award of the prize based on a single attribute. However, it will be appreciated that blending these different attributes may be accomplished.

In 620, the appropriate contribution interval for the chosen attribute is determined. This may be a predetermined interval for the particular attribute, a time since the prize was last one by a game player whose terminal had the particular attribute, the time since any terminal won a progressive prize, or the time since the progressive prize was initially awarded. Other pre-arranged choices are also possible.

In 630, the total contribution made to the progressive prize fund by game terminals having the chosen attribute during the contribution interval is determined. This can be maintained as aggregates at all times, updated at periodic intervals, or could be determined by analyzing raw wager and win transaction data, or by other methods.

In 640, the total contributions made by all participating game terminals to the progressive prize fund during the contribution interval may be determined. This may be determined, e.g., by calculating from raw transaction data on demand, or by maintaining aggregates in either real time or at periodic intervals.

In 650, the amount of the jackpot may be awarded as a function of the total contributions to the progressive prize fund and the contributions made by game terminals having the particular chosen attribute. For example, the fraction of the total pool awarded may be directly proportional to the amount of contributions made by the game terminals having the particular chosen attribute. In this case, as an example, if one third of the progressive prize fund were contributed by game terminals in a particular location, one third of the fund would be awarded as a prize if a game terminal in that location won the progressive prize. Alternatively, other more complex formulas may be used to determine the progressive prize, but generally it is preferable if they increase relative to the contributions made by terminals having the particular attribute.

In 660, whether the awarded prize exceeds a minimum prize may be determined. This minimum prize may be for all terminals participating in the progressive game, or for terminals having a particular attribute. For example, a particular terminal operator might arrange with the progressive game operator to guarantee a certain minimum prize for terminals run by that terminal operator.

In 665, if the minimum prize has not been reached, a notification of the progressive prize amount may be sent, e.g., from the progressive game host to the game terminal or notification device, indicating the size of the minimum prize.

Alternatively, in 670, which is reached if the minimum prize has been exceeded, a notification of the prize amount as determined using the appropriate formula may be sent.

In 680, information about the size of the jackpot and about contributions made by terminals having the particular attribute may be made. In 690, the contribution interval and time since last prize awarded may be reset.

The example procedure described above allows multiple game terminal operators with multiple game terminals to participate in a single large progressive jackpot maintained by a progressive game terminal operator. At the same time, the game terminal operators may adjust the frequency with which progressive games are won, as well as the contribution amount, and other attributes, while still being part of the single progressive prize pool. This avoids the administrative costs of having multiple progressive games.

Figure 7:
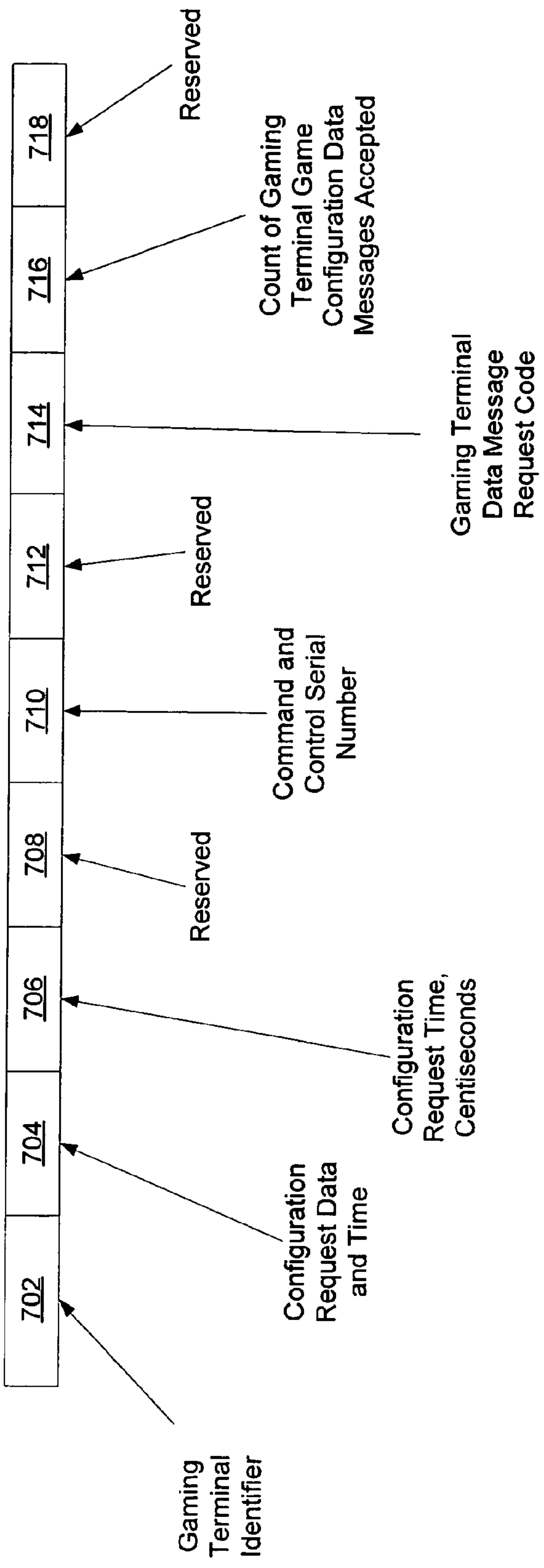
FIG. 7 illustrates an example progressive game terminal control data, according to an example embodiment of the present invention.

Gaming terminals may be controlled by command and control data messages. A command and control data message may include a command and control data message header and a variable number of data blocks. FIG. 7 illustrates an example command and control data message header according to the present invention. These message may be passed between the game terminals and the progressive game host.

The example header may include a gaming terminal identifier 702. A gaming terminal identifier 702 may be received during gaming terminal configuration. The configuration procedure is discussed below with reference to FIG. 8. The gaming terminal identifier 702 may be stored in the gaming terminal's non-volatile memory and may be used to identify the gaming terminal. The gaming terminal identifier 702 may be, for example, a numerical identifier, which is unique within a video lottery network and persists through hardware modifications or replacement. This system-wide identifier may address messages sent from the remote host or local host to a gaming terminal and may identify the source of data sent from a gaming terminals to a remote host or local host. For example, the gaming terminal identifier may be a 23 bit unsigned integer that numerically identifies a gaming terminal and is transmitted in a 32 bit field.

After a gaming terminal's initial configuration, a gaming terminal may receive a new gaming terminal identifier in configuration data which differs from its current gaming terminal identifier. In this case, the gaming terminal may retain the newly-received gaming terminal identifier. The gaming terminal identifier may be sent from the gaming terminal to any host and from any host to the gaming terminal in the data. The identifier may be restricted from appearing on any player-, retailer-, or technician-accessible video display or gaming terminal-generated printed slip. If a gaming terminal receives data containing a gaming terminal identifier which is not its own, the gaming terminal may receive the data and report that invalid data have been received. Since the gaming terminal identifier is sent to a gaming terminal as part of its configuration data, a gaming terminal that has not been configured may not be recognized or identified by a gaming terminal identifier. Therefore, for example, a gaming terminal which has not yet been configured may accept data with the gaming terminal identifier 0x000000 or any valid gaming terminal identifier, and may use that in gaming terminal-generated data messages. Data containing the pre-configuration gaming terminal identifier, such as 0x000000, received by a configured gaming terminal may be treated as data containing an incorrect gaming terminal identifier.

The gaming terminal identifier may be associated with a gaming terminal identification string, though there is no restriction that these identifiers be paired. The gaming terminal identification string, a character string identifier assigned to each gaming terminal, may be unique throughout a jurisdiction and afford a flexible method to identify a gaming terminal. The gaming terminal identification string may be transmitted to a gaming terminal during its configuration. The gaming terminal identification string and may also provide identification of a physical gaming terminal unit which persists through hardware modifications or replacement. For example, the gaming terminal identification string may be stored in nonvolatile memory after the gaming terminal accepts the initial configuration data. The gaming terminal identification string may be displayed on the gaming terminal's video display, for example, on-demand by authorized personnel, and may appear on items printed by the gaming terminal. The gaming terminal identification string, may be, for example, a 16 character identifier.

The command and control data message header may include the configuration request date and time 704. The date and time information transferred may be represented in the gaming terminal's local time with reference to a selected date and time. For example, the configuration request date and time 704 may be represented by the number of seconds since, for example, 1 Jan. 1970 at midnight. The remote and/or local hosts may compensate for time-zone differences within a single gaming system. The time may further be resolves to centiseconds ($1/100$ second) 706. The system may support centisecond configuration request date and time data, while gaming terminals not able to resolve time to centisecond resolution may use 0 in the centisecond field 706. The command and control data message header may include reserved fields 708, 712, 718.

The command and control data message header may include a command and control serial number 710. This number may be used to distinguish command and control data messages from one another. The command and control data message header may include a gaming terminal data message request code 714. This is a code that identifies the type of command and control data configuration message that is being requested. For example, there may be one code for a system configuration data message, a second code for a time configuration data message, a third code for a gaming terminal specific configuration data message, and a fourth code for a game configuration data message.

The command and control data message header may include a gaming terminal configuration data messages accepted field 716. This field may contain the number of gaming terminal game configuration data messages accepted by the gaming terminal to this point in the configuration process. The total number of the gaming terminal game configuration messages to request may be contained in the request gaming terminal configuration data block that initiated the request. This field may be reserved if the gaming terminal configuration data message request code is not the code for a game configuration data message.

Figure 8:
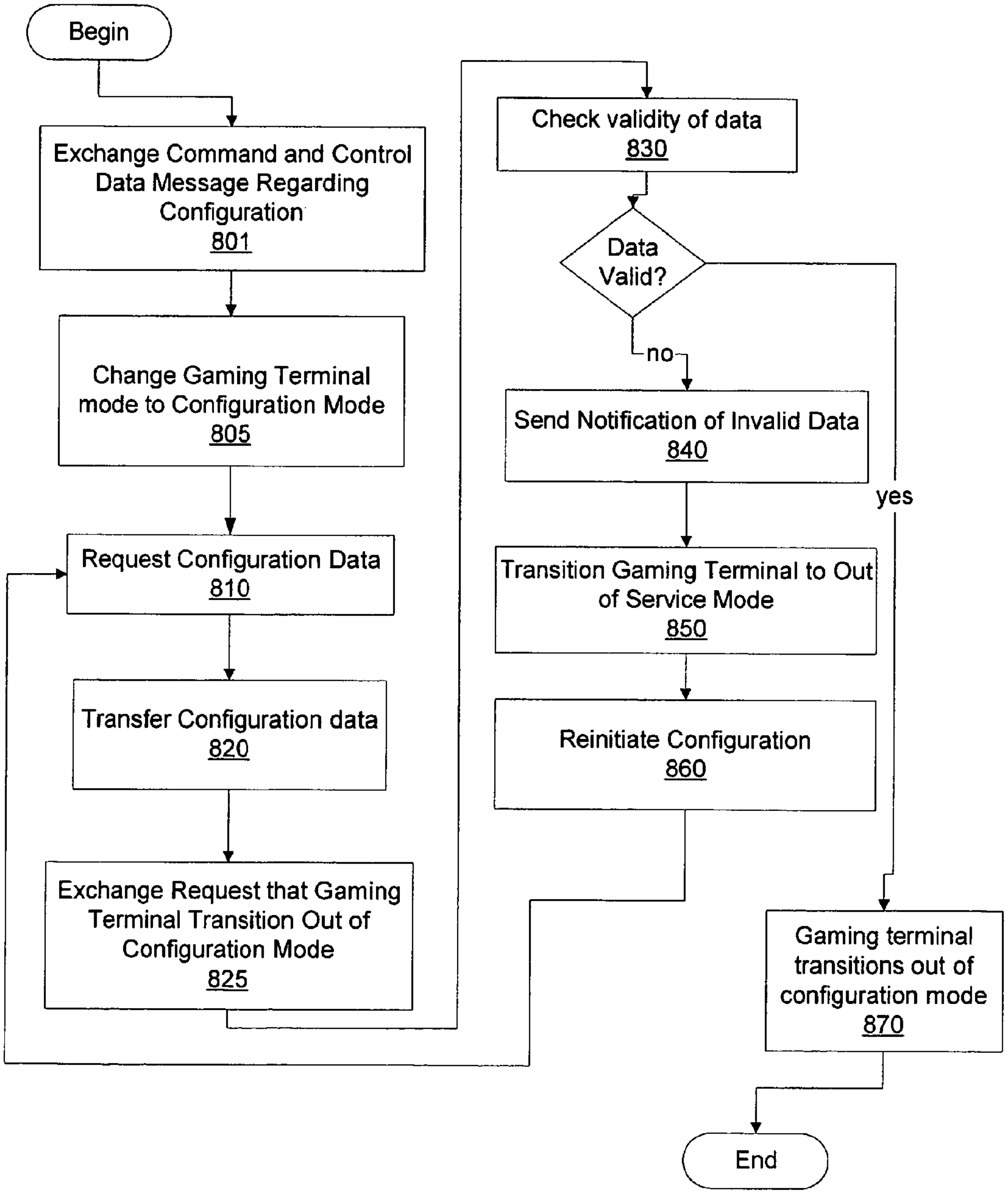
FIG. 8 illustrates an example progressive game terminal configuration procedure, according to an example embodiment of the present invention.

FIG. 8 illustrates an example gaming terminal initialization procedure, according to an example embodiment of the present invention. This procedure may be used to initialize a game terminal as part of the progressive game. By using a standard procedure with uniform messages, terminals from multiple providers, game terminal operators, and base game types may all be integrated in a single progressive game operated by the progressive game host. At 801 a command and control message requesting configuration is sent. For example, the remote host may send a request to a gaming terminal or group of gaming terminals. At 805, each gaming terminal that received the request may transition from the current gaming terminal mode to configuration mode. Gaming terminal modes may include, for example, configuration mode, factory mode, enable mode, disable mode, and temporary disable mode.

The gaming terminal mode may determine what system directives the gaming terminals will obey. The gaming terminal mode may be set by the host via a command and control data message and may be retained in non-volatile memory. A configured gaming terminal may also be able to set its gaming terminal mode to gaming terminal program validation disable mode autonomously in its restart code that is executed after a powered-off or reset condition and at the program validation time set in the gaming terminal time configuration data. A gaming terminal may be set to various modes by one of the hosts. The gaming terminal may report its current gaming terminal mode in status monitor data called a gaming terminal status monitor message. Gaming terminals which have not yet been configured or placed into configure mode may be in factory mode. Gaming terminals in this condition may accept only the command and control data that sets the gaming terminal mode to configure. All other accounting and security mechanisms may be disabled while in factory mode. Various time disables may be set in the gaming terminal time configuration data message and through these, the gaming terminal game configuration data messages may govern the periods of gaming terminal playable operation. The time disables may be prevented from being superseded by a gaming terminal mode set which directs the gaming terminal to transition to a playable condition during time disabled periods.

At 810, the configuration data is requested. For example, the gaming terminal may request configuration data, which it may specify in the request gaming terminal configuration data block of a gaming terminal data message. At 820, the configuration data is transferred. For example, the remote host or local host may transfer the configuration data in a data transfer data block. At 825 a request is exchanged that the gaming terminal transfer out of configuration mode. For example, the remote host or a local host may transfer a command and control data message commanding the gaming terminal to transition from configuration mode to an enabled mode so that play may begin on the gaming terminal. At 830, the validity of the data is checked. For example, the gaming terminal may check the validity of the data through its own mechanisms to ensure that there was no corruption of the data during the transfer. If the data is not valid, then a notification of invalid data may be sent 840. For example, if the gaming terminal is used to check the validity of the data, the gaming terminal may send the notification of invalid data 840 to a remote host or a local host. At this point, the gaming terminal may transition to an out of service mode 850 to so that game play may not begin on the gaming terminal using the invalid data. Following this transition, the configuration procedure may be reinitiated 860. For example, for security purposes, it may be required that an attendant, for example, an authorized facility employee, manually reinitiate the configuration procedure. After the configuration process has been reinitiated 860, another request for configuration data 810 may be exchanged. Once it is determined that valid data has been exchanged, the gaming terminal may transition out of configuration mode 870. At this point the configuration procedure is complete.

The gaming terminals may be configured to include any games that have been formatted according to the compatibility requirements of the system. The present invention allows for gaming terminals running games by a variety of vendors to be eligible to win the same progressive jackpot. Game identifiers and game types may be assigned to the games to enable the system to track the games in use. A game identifier may define a playable game on gaming terminals and include, among other parameters, credit size, maximum bet, maximum win, pay table, hours of operation, and participation in progressive jackpot games. Game identifiers may be assigned by the host computer and may be transferred to the gaming terminal in the gaming terminal game configuration data. Games which are identically defined with respect to their rules among more than one gaming terminal vendor may be assigned the same game identifier by the host system. A single game identifier may be required for participation in system-wide progressive games, for example, which may be played on more than one gaming terminal vendor's gaming terminals.

Game types are gaming terminal vendor defined designations that may be used to associate the game identifier with the executable code of the game. The executable programs are vendor-specific, therefore, the parameters designated by a game type may or may not specifically encompass those parameters defined by the game identifier. The game type may be assigned by the gaming terminal vendor and therefore may be used to determine which part of the gaming terminal's program code is to be used.

Each game identified by the game identifier may be associated with a specific game slot in a particular gaming terminal game set. The game slot may be, for example, a logical designation that allows the host and the gaming terminal to index the game identifiers that are available on the gaming terminal. The logical game slot/game identifier relationships may be unique to any particular gaming terminal, but may need to be known to the host for the gaming terminal's configuration. Gaming terminal vendors may not associate game types and game slots. Game references between the gaming terminals and their remote and local hosts may be made according to the game slot, rather than by another identifier. The host computer may not limit the number of games or game slots per gaming terminal.

Figure 9:
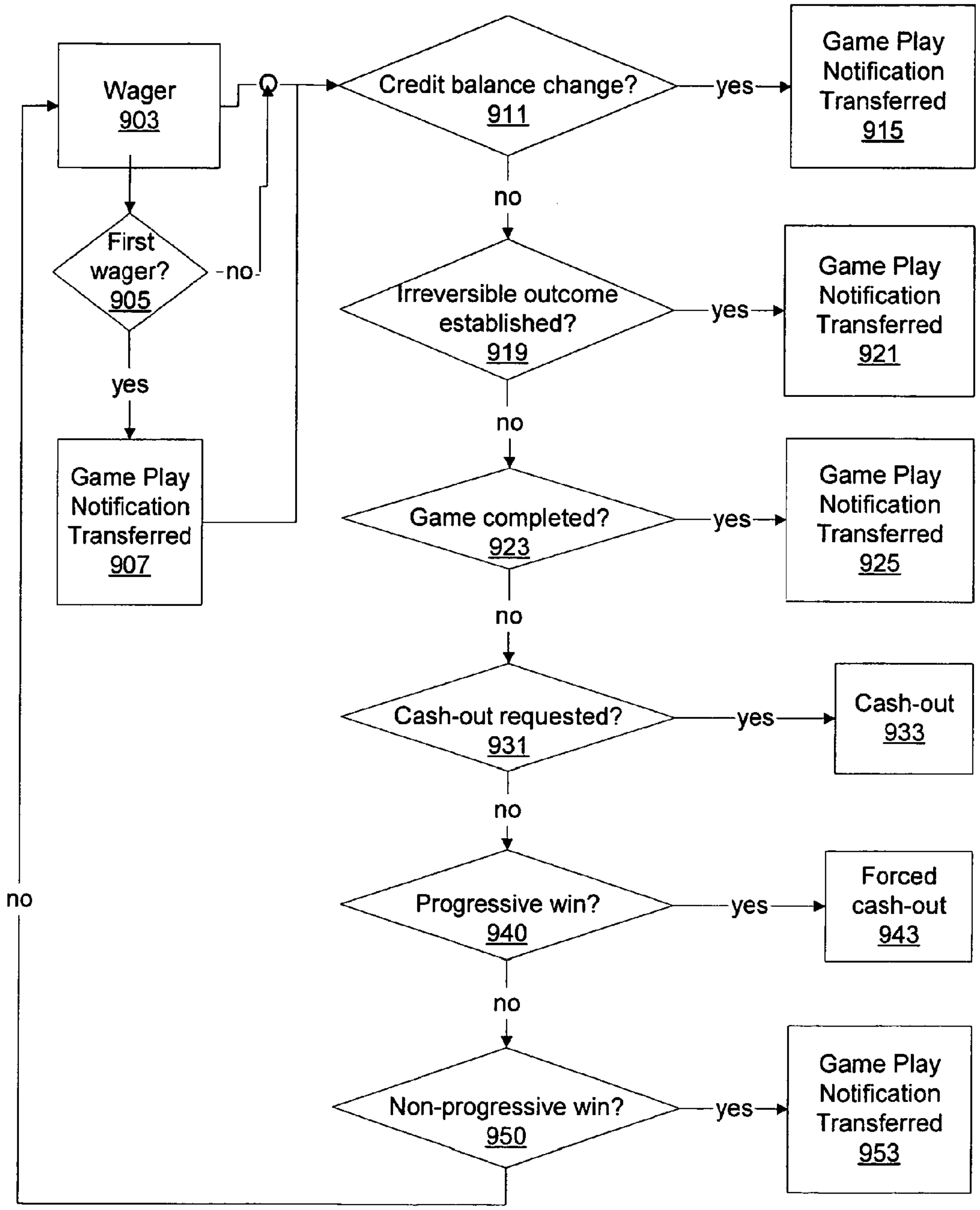
FIG. 9 illustrates an example game play sequence, according to an example embodiment of the present invention.

Once all configurations have taken place, the gaming terminal may be used for game play. FIG. 9 illustrates an example game play sequence, according to an exemplary embodiment of the present invention. The term game play is used to describe a single instance of a wager and subsequent play on a single gaming terminal for a specific game identifier that has a single and particular outcome. Counts of plays and play wins and a play history of each play may be maintained by the gaming terminals or the remote or local hosts. The completion of a single play is defined as the expiration of the currently wagered credits or when a single and particular outcome has been determined. Extended game play may occur after the completion of a primary game play, which resulted in a win of the primary game. Divisional win counts and amounts and the extended play outcomes by the game may be reported in gaming terminal game monitor data.

At 903, a wager is made, for example, a player may insert money into a bill acceptor and wager a portion of the now available credit in accordance with the game being played. The player may use a slip or card that is associated with a credit balance in order to begin play. At 905, a check may be made to determine if the wager made is the first wager of the game play session. If so, at 907 a game play notification data message may be sent to a remote or local host. Game play notification data may be required to be transferred to the host from the gaming terminal whenever a predetermined event occurs. For example, if a player's credit balance changes 911, for example, at the acceptance of bills or credit balance transfers by the gaming terminal, a game play notification may be transferred 915. Additionally, at 919, at intermediate points in the game play at which irreversible outcomes have been established, a game play notification 921 may be transferred. At 923, if a game has been completed, for example, the last card of the deck has been revealed in a blackjack type game, a game play notification may be transferred 925. A player may request a cash-out 931 at any point during the game, and if this occurs, a cash-out procedure is initiated 933. Similarly, if the wager 903 results in a progressive win 940, a forced cash-out procedure may occur 943. If the wager 903 results in a non-progressive win, a game play notification may be transferred 953. In the absence of a progressive win 940, wagers may continue to be made on the gaming terminal, after the appropriate game play notification has been transferred, if required.

In order to track game play, up to the minute gaming terminal monitor data may be transferred at intervals specified jurisdictionally, during a program validation procedure, or at any time. For example, gaming terminals may transfer the results of a day-end snapshots at times specified in the gaming terminal's time related configuration data or when requested by a remote or local host. Gaming terminals, remote hosts, and/or local hosts may retain the most recent day-end monitor snapshot in non-volatile memory.

Figure 10:
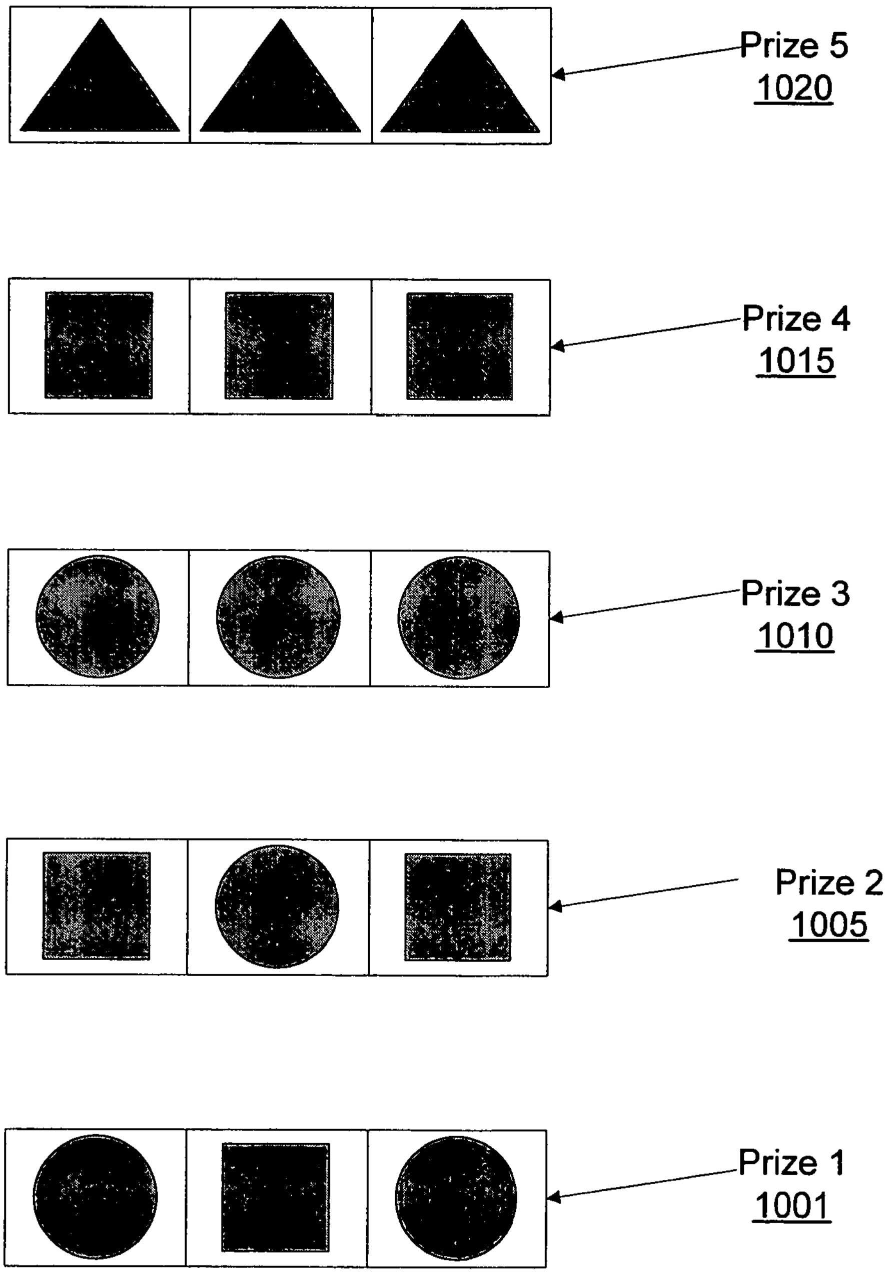
FIG. 10 illustrates an example pay table according, to an example embodiment of the present invention.

For the system, all games may be enabled for use in the progressive gaming system, meaning that a portion of all wagers made during play of these games contributes to a prize pool designated the progressive prize, or progressive jackpot. Included in the pay table for these games is a condition for winning the progressive prize. It will be appreciated that, with the use of the example procedures described herein, it is possible for the frequency of the progressive wins to be set by the game terminal operator. FIG. 10 illustrates an exemplary embodiment of a pay table for a progressive game of a slot machine type. At 1001, a combination of, for example, one circle, followed by one square, followed by one circle, appears in the slots. This combination may represent a first prize of a predetermined value. At 1005, a combination of, for example, one square, followed by one circle, followed by one square, may appear in the slots. This combination may represent a second prize of predetermined value, which is of greater value than the first prize. At 1010, a combination of, for example, three circles, may appear in the slots. This combination may represent a third prize of predetermined value, which is of greater value than the second prize. At 1015, a combination of, for example, three squares, may appear in the slots. This combination may represent a fourth prize of predetermined value, which is of greater value than the third prize. At 1020, a combination of, for example, three triangles, may appear in the slots. This combination may represent a fifth prize of predetermined value, which is of greater value than the fourth prize. This prize may also represent a win of the progressive jackpot. Other combinations of the shapes are possible, and may result in the win of other prizes, or may result in a loss, which is associated with no prize at all. It should be noted that the winning of the progressive prize may, in some embodiments of the present invention, be determined by the game terminal rather than by the progressive game host.

Figure 11:
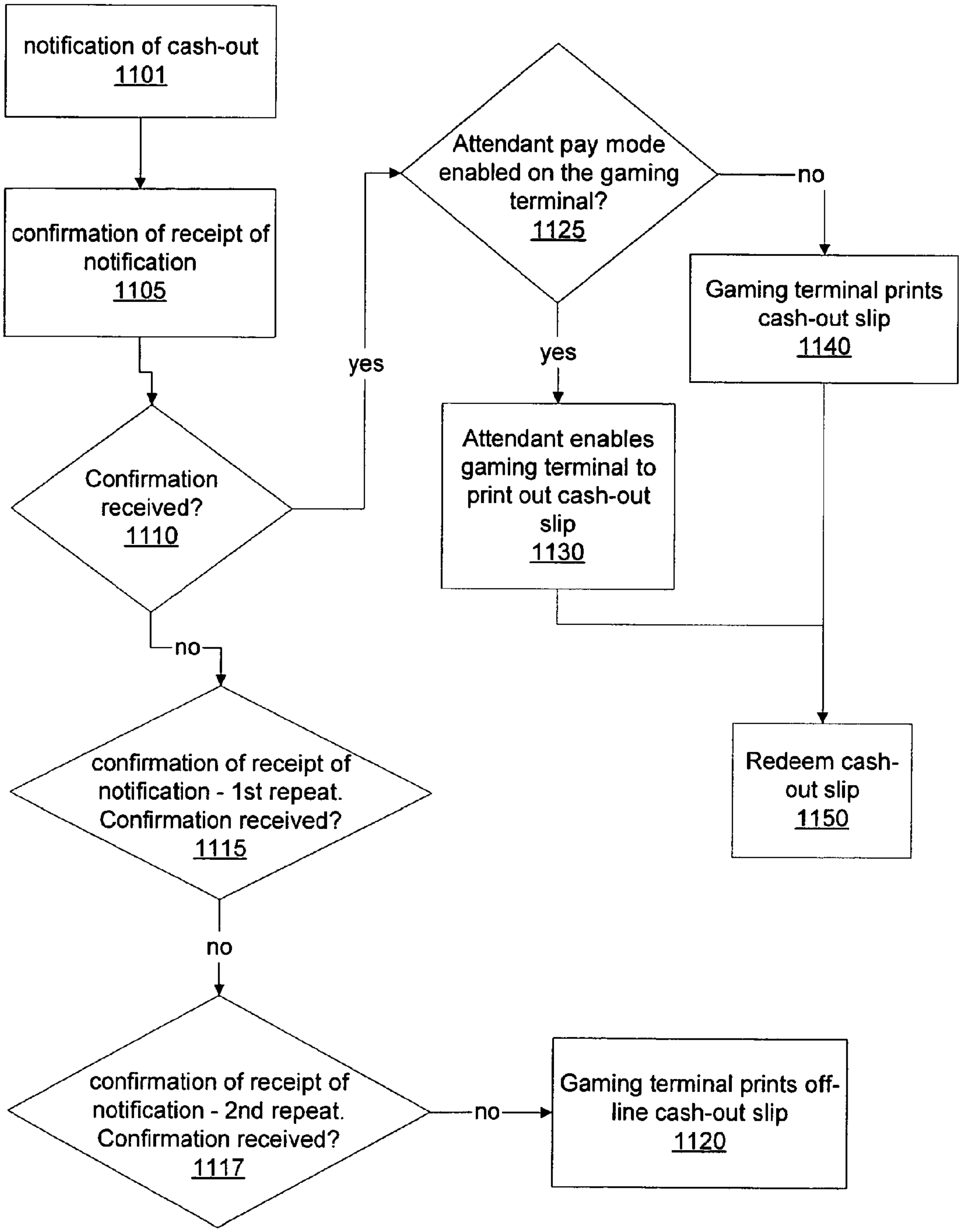
FIG. 11 illustrates an example cash-out procedure, according to an example embodiment of the present invention.

FIG. 11 illustrates an example cash-out procedure according to an example embodiment of the present invention. This embodiment may include game terminals that use paper credit or "cash out slips". Gaming terminals may produce cash-out slips, for example, at the players' request, after transitions to unplayable conditions, when certain credit balance conditions are met, as required jurisdictionally, or when a progressive jackpot is apparently won. At 1101, notification of the cash-out request is transferred, for example, the gaming terminal may transfer notification of the cash-out request to a remote host or a local host. At 1105, confirmation of receipt of the notification is sent, for example a host may send confirmation of receipt of the notification to the gaming terminal. The confirmation may include a cash-out slip identification number, which may eventually be printed on the cash-out slip. At 1110, a check may be performed to ensure that the confirmation was received, for example, the gaming terminal may perform a check to ensure that it has received the confirmation. If the confirmation is not received, at 1115, a first repeated attempt may occur. At 1117, if the confirmation is not received at the first repeated attempt, a second repeated attempt may occur. If the second repeated attempt is not successful at confirming receipt of notification, the terminal may print an off-line cash-out slip at 1120. The gaming terminals maintain in non-volatile memory a cash-out sequence number which may be transmitted to the host in the cash-out slip notification data, and used to generate off-line cash-out slip identification numbers. This number is initialized by the host in configuration data. Since the initialized value represents the last cash-out slip (or 0 if reinitialized), this value should be incremented prior to generating the cash-out notification data for transmittal. The sequence number value placed in the original cash-out notification data should remain constant through any retries that may occur. A gaming terminal which printed such an off-line cash-out slip may continue to queue the appropriate notification data (which contains the cash-out slip identification number which was printed) to the host (waiting for the appropriate data link time-outs) and may not resume operations until the appropriate confirmation has been received.

When the gaming terminal receives a valid confirmation at 1140, the gaming terminal may print a cash-out slip which can be identified by the cash-out slip identification number contained in the confirmation data received from the host. An attendant pay mode may be enabled on the gaming terminal at 1125, which may require an attendant, for example, an employee of the gaming facility, to use, for example, a key or a code to enable the gaming terminal to print a cash-out slip at 1130.

The following items may appear on cash-out slips as jurisdictionally required: the cash-out slip identification number, a cash-out sequence number, a gaming terminal identification string, a value of cashed-out credits, and the time and date carried in the cash-out notification data. Other information may appear on cash-out slips, for example, as required jurisdictionally. Progressive jackpot wins are accompanied by a forced cash-out, therefore the cash-out slip procedure follows a progressive jackpot win. Certain jurisdictionally-specific rules may require non-player requested cash-outs. A field in the cash-out slip notification data message may inform the host that such action is may be required. The requirements for this notification and the required actions of the gaming terminals in these instances may be specified jurisdictionally.

A cash-out may be forced whenever the progressive jackpot is won. The accounting of progressive jackpot amounts may be done in real-time by the remote host using data gathered through the game play notification data transmitted from the gaming terminals to the host. The apparent win of a progressive jackpot may be signaled through a forced cash-out on the gaming terminal. Therefore, all progressive jackpot wins may be confirmed on the host computer before the player's credit balance is altered. Cash played for the progressive game may be tracked by the host computer using data in the game play notification data message. The gaming terminal may be unaware of the current progressive jackpot and may report 0 in all fields of data messages where an estimate of the progressive jackpot value is defined. The host may make use of the progressive enabled field in the configuration data messages to identify the game as participating in a progressive jackpot. For game plays that result from a progressive jackpot win, only the non-progressive win amount may be sent in the final game play notification. This means for cases where no additional non-progressive wins are reported, that the final game play notification will indicate a non-win, for example, a reported credit balance change of zero. Progressive jackpot wins may be tracked solely by the host computer, therefore all Progressive jackpot win amounts may not be included in the game play notification data. Additionally, progressive wins may be signaled to the host in the cash-out slip notification message. In order to promote timely messaging to the host, a progressive cash-out notification may take priority over outstanding gaming terminal messages and should therefore be advanced to be the next conversation, however, the gaming terminal cannot abort a conversation it has initiated.

There may be one progressive jackpot and there may be one prize reset amount or seed. This amount may be, for example, $15,000. There may be a reserve account, which will accumulate up to a threshold, for example, four times the seed amount. A single contribution percentage may be set for wagers made on the progressive games. The contribution, may be, for example, 4%. When the reserve account reaches its threshold, the percentage allocated to the reserve may be allocated to the progressive jackpot pool. The prize reset amount, or seed, may be drawn from the reserve account. Wins that are time stamped within a defined processing window will be considered simultaneous. Therefore, once a win occurs, another progressive jackpot is started with the seed amount, allowing play to continue on the non-winning gaming terminals without interruption.

Those skilled in the art can appreciate from the foregoing description that the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A system for facilitating the play of a game of chance, comprising:

a plurality of base games;

a plurality of game terminals located in a plurality of locations, each of the plurality of game terminals configured to allow a player to play at least one of the plurality of base games, the plurality of game terminals being divided into a plurality of sets of game terminals, each of the plurality of sets of game terminals having a respective progressive contribution interval;

a progressive game server;

a network providing communication from the game terminals toward the progressive game server; and a shared progressive game jackpot maintained by the progressive game server, the shared progressive game jackpot accruing contributions as a result of a player's playing games on the plurality of game terminals;

a contribution amount range stored on the progressive game server, the contribution amount range containing all possible contribution amounts for the plurality of sets of game terminals;

a contribution amount selected from the contribution amount range and associated with a first set of game terminals, the contribution amount indicating an amount from a player's wager at any game terminal in the set of game terminals which is accrued to the shared progressive game jackpot when a game is played at the game terminal;

the progressive game server determining the size of a progressive prize when a winning player wins a progressive game on a game terminal in a first set of game terminals, the size of the progressive prize depending on the amount of contributions accrued from the first set of game terminals to the shared progressive game jackpot in the first set of game terminals' progressive contribution interval.

2. The system of claim 1, further comprising a management server, in communication with the first set of game terminals.

3. The system of claim 2, wherein the management server is configured to receive information about the play of base games on the first set of game terminals and to transmit a subset of this information toward the progressive game server.

4. The system of claim 2, wherein the management server determines that the progressive game has been won when the winning player wins the progressive game.

5. The system of claim 2, wherein the progressive server determines that the progressive game has been won and provides notification to the management server.

6. The system of claim 2, wherein the management server aggregates data from the first set of game terminals and forwards the aggregated data to the progressive game server at regular intervals.

7. The system of claim 1, wherein the progressive game server determines the progressive game has been won.

8. The method of claim 1, wherein the game terminal determines that the progressive game has been won.

9. The system of claim 1, wherein the contribution intervals for each set of game terminals is the same.

10. The system of claim 9, wherein the contribution interval is the time since any player last won the shared progressive game jackpot.

11. The system of claim 9, wherein the contribution interval is a predetermined time interval.

12. The system of claim 1, wherein the contribution interval for a set of game terminals is the time since any player won the progressive jackpot on any game terminal in the set of game terminals.

13. The system of claim 1, wherein the contribution interval for a set of game terminals is a predetermined time interval associated with the set of game terminals.

14. The system of claim 1, wherein the progressive server decrements the progressive prize jackpot by the size of the progressive prize, when the progressive prize is awarded.

15. The system of claim 14, wherein the progressive server sets the progressive prize jackpot to be at least equal to a minimum progressive prize floor after the progressive prize has been awarded.

16. The system of claim 1, further comprising:

a minimum contribution threshold stored on the progressive game server, the minimum contribution threshold indicating a minimum amount of contributions to the shared progressive prize jackpot that must be accrued from a set of game terminals before the progressive prize can be won by a player playing at a game terminal in the set of game terminals.

17. The system of claim 1, further comprising:

a minimum inter-prize threshold stored on the progressive game server, the minimum inter-prize threshold indicating a minimum amount of time that must elapse after a player wins the progressive prize at a game terminal in a set of game terminals until another player is eligible to win the progressive prize at any game terminal in the set of game terminals.

18. The system of claim 1, further comprising a progressive win notification device associated with one of the sets of game terminals, the progressive win notification device in communication with the progressive server, and configured to receive an indication that the progressive prize has been won by a game terminal in the set of game terminals, and provide a notification that the prize has been won after the indication has been received.

19. The system of claim 18, wherein the progressive win notification device is not connected with a game terminal.

20. The system of claim 1, wherein the network is the Internet.

21. The system of claim 1, wherein the game terminal comprises a video display, a player input mechanism, a processor, and a network communication device.

22. A system for facilitating the play of a game of chance, comprising:

a plurality of base games;

a plurality of game terminals located in a plurality of locations, each of the plurality of game terminals configured to allow a player to play at least one of the plurality of base games, the plurality of game terminals being divided into a plurality of sets of game terminals, each of the plurality of game terminals having a respective progressive contribution interval;

a progressive game server;

a network providing communication from the game terminals toward the progressive game server; and a shared progressive game jackpot maintained by the progressive game server, the shared progressive game jackpot accruing contributions as a result of a player's playing games on the plurality of game terminals;

the progressive game server determining the size of a progressive prize when a winning player wins a progressive game on a game terminal in a first set of game terminals, the size of the progressive prize depending on the amount of contributions accrued from the first set of game terminals to the shared progressive game jackpot in the progressive contribution interval, wherein the size of the progressive prize is proportional to the contributions accrued from the first set of game terminals during the progressive contribution interval divided by the total progressive prize contributions from all sets of game terminals in the progressive prize contribution interval.

23. The system of system of claim 22, further comprising a management server, in communication with the first set of game terminals, the management server being configured to receive information about the play of base games on the first set of game terminals and to transmit a subset of this information toward the progressive game server.

24. The system of system of claim 22, wherein the contribution interval is the time since any player last won the shared progressive game jackpot.

25. The system of claim 22, wherein the contribution interval is a predetermined time interval.

26. The system of claim 22, wherein the network is the Internet.

27. The system of claim 22, wherein the game terminal comprises a video display, a player input mechanism, a processor, and a network communication device.

* * * * *